United States Patent
Kim et al.

(10) Patent No.: US 7,442,465 B2
(45) Date of Patent: Oct. 28, 2008

(54) JELLY-ROLL TYPE ELECTRODE ASSEMBLY, LITHIUM SECONDARY BATTERY HAVING THE SAME, AND METHOD FOR MANUFACTURING THE SAME

(75) Inventors: Jong Ku Kim, Youngin-si (KR); Akihiko Saito, Youngin-si (KR); Yoo Kyoung Kim, Youngin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 194 days.

(21) Appl. No.: 11/218,726

(22) Filed: Sep. 2, 2005

(65) Prior Publication Data

US 2006/0073380 A1   Apr. 6, 2006

(30) Foreign Application Priority Data

Sep. 6, 2004   (KR) ............... 10-2004-0070915

(51) Int. Cl.
   *H01M 2/14*   (2006.01)
   *H01M 6/10*   (2006.01)
   *H01M 2/26*   (2006.01)
   *H01M 10/04*  (2006.01)

(52) U.S. Cl. .................. 429/129; 429/94; 429/186; 429/161; 429/211; 29/623.1; 29/623.4

(58) Field of Classification Search .......... 429/129, 429/94, 186, 161, 211; 29/623.1, 623.4
   See application file for complete search history.

(56) References Cited

U.S. PATENT DOCUMENTS

| | | | |
|---|---|---|---|
| 6,627,344 B2 | 9/2003 | Kang et al. | |
| 6,869,725 B2 * | 3/2005 | Iwanaga et al. | 429/130 |
| 7,033,697 B2 * | 4/2006 | Park et al. | 429/211 |
| 2003/0215700 A1 * | 11/2003 | Hosoda et al. | 429/94 |

FOREIGN PATENT DOCUMENTS

| | | |
|---|---|---|
| JP | 2000-173657 | 6/2000 |
| JP | 2001-126769 | 5/2001 |
| JP | 2002-280055 | 9/2002 |
| JP | 2003-243036 | 8/2003 |

OTHER PUBLICATIONS

Patent Abstract of Japan, Publication No. 2000-173657, published Jun. 23, 2000, in the name of Akashi Hiroyuki.
Patent Abstracts of Japan, Publication No. 2001-126769, dated May 11, 2001, in the name of Kenji Nakai et al.
Patent Abstracts of Japan, Publication No. 2002-280055, dated Sep. 27, 2002, in the name of Mikio Oguma et al.
Patent Abstracts of Ja, Publication No. 2003-243036, dated Aug. 29, 2003, in the name of Yoshin Yagi et al.

* cited by examiner

*Primary Examiner*—Patrick Ryan
*Assistant Examiner*—Angela Martin
(74) *Attorney, Agent, or Firm*—Christie, Parker & Hale, LLP

(57) ABSTRACT

A jelly-roll type electrode assembly, a lithium secondary battery having the same, and a method for manufacturing the same are provided. The electrode assembly comprises a deformation prevention core which simplifies the manufacture of a lithium secondary battery and prevents deformation of the electrode assembly. The electrode assembly comprises positive and negative electrode plates and a separator wound around a deformation prevention core. A positive electrode active material is coated on the positive electrode plate and a negative electrode active material is coated on the negative electrode plate. The separator insulates the positive electrode plate from the negative electrode plate. The deformation prevention core is located near the center of the electrode assembly.

18 Claims, 5 Drawing Sheets

JELLY-ROLL TYPE ELECTRODE ASSEMBLY, LITHIUM SECONDARY BATTERY HAVING THE SAME, AND METHOD FOR MANUFACTURING THE SAME

CROSS-REFERENCE TO RELATED APPLICATION

This application claims priority to and the benefit of Korean Patent Application No. 2004-0070915, filed Sep. 6, 2004 in the Korean Intellectual Property Office, the entire content of which is incorporated herein by reference.

FIELD OF THE INVENTION

The present invention relates to a jelly-roll type electrode assembly, a lithium secondary battery having the electrode assembly, and a method for manufacturing the lithium secondary battery. More particularly, the invention is directed to a jelly-roll type electrode assembly having a deformation prevention core which simplifies the manufacture of the lithium secondary battery and prevents deformation of the electrode assembly.

BACKGROUND OF THE INVENTION

Light, compact electric and electronic devices such as cellular phones, notebook computers, and camcorders have recently been actively developed and produced. Such portable electric and electronic devices operate on battery packs when separate power sources are unavailable. Each battery pack includes at least one battery for driving the portable electric or electronic device.

For economic reasons, the battery pack generally comprises a secondary battery, which can be charged and discharged. Exemplary secondary batteries include nickel-cadmium (Ni—Cd) batteries, nickel-hydrogen (Ni-MH) batteries, lithium (Li) batteries and lithium ion (Li-ion) batteries.

Lithium secondary batteries operate at 3.6 V, a voltage three times that of nickel-cadmium batteries or nickel-hydrogen batteries which are widely used as power sources for portable electronic devices. Lithium secondary batteries also have high energy density per unit weight.

Lithium secondary batteries primarily use lithium oxides as positive electrode active materials and carbon materials as negative electrode active materials. Generally, lithium secondary batteries are classified according to the electrolyte used, namely, lithium ion batteries use liquid electrolytes and lithium polymer batteries use high molecular weight electrolytes. Lithium secondary batteries can take various shapes, including cylinders, squares, and pouches.

One typical lithium secondary battery comprises an electrode assembly, which includes a positive electrode plate on which a positive electrode active material is coated, a negative electrode plate on which a negative electrode active material is coated, and a separator positioned between the positive electrode plate and the negative electrode plate. The separator prevents short circuits and allows only lithium ions to pass. The lithium secondary battery further comprises a battery case for containing the electrode assembly, and an electrolyte for enabling movement of lithium ions, which electrolyte is injected into the battery case.

A positive electrode tab is connected to the positive electrode plate, which is coated with a positive electrode active material. A negative electrode tab is connected to the negative electrode plate, which is coated with a negative electrode active material. The electrode assembly is manufactured by laminating the positive electrode plate with the positive electrode tab attached, the negative electrode plate with the negative electrode tab attached, and the separator. After lamination, the positive and negative electrode plates and the separator are wound to form the electrode assembly.

Thereafter, the electrode assembly is contained in the battery case, the electrolyte is injected into the battery case, and the battery case is sealed to complete the lithium secondary battery.

According to another lithium secondary battery, the positive electrode plate, the negative electrode plate, and the separator are wound using a core or mandrel. However, during submersion of the electrode assembly in the electrolyte, the volume changes and expands due to heat generated during charging or discharging. Use of a core or mandrel can increase the volume expansion.

In addition, pressure is applied to the electrode assembly due to gas pressure generated during charging or discharging. Further pressure is applied to the electrode assembly as lithium ions gradually attach to the electrode plate, expanding the electrode plate. This pressure causes the electrode assembly to deform.

Further, the electrode assembly is restricted to the volume of the battery case. Therefore, when the electrode assembly deforms, it can be damaged.

In addition to deformation, the battery may swell, i.e. the battery case may become thicker. When this occurs, the battery does not perform well and cannot be easily mounted on the desired electric or electronic device.

SUMMARY OF THE INVENTION

The present invention is directed to a jelly-roll type electrode assembly, a lithium secondary battery having the electrode assembly, and a method for manufacturing the lithium secondary battery. The electrode assembly has a deformation prevention core which simplifies the manufacture of the lithium secondary battery and prevents deformation of the electrode assembly.

A jelly-roll type electrode assembly according to one embodiment of the present invention comprises a positive electrode plate on which a positive electrode active material is coated, a negative electrode plate on which a negative electrode active material is coated, and a separator positioned between the positive and negative electrode plates. The separator insulates the positive and negative electrode plates from each other. The electrode assembly further comprises a deformation prevention core positioned near the center of the electrode assembly. The positive and negative electrode plates and the separator are wound around the deformation prevention core.

In one embodiment, the deformation prevention core takes a shape selected from the group consisting of rods and plates.

The deformation prevention core comprises a metallic or insulative material. The insulative material may comprise a material selected from the group consisting of polyethylene, polypropylene, polyethyleneterephthalate, and polyimide.

In one embodiment, the end of the separator is fixed to the deformation prevention core by a tape or adhesive. The tape may comprise a material selected from the group consisting of polypropylene, polyethylene, polyester, and nylon resins. The adhesive may comprise a material selected from the group consisting of polyvinylidenefluoride (PVDF), co-polymers of polyhexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon and mixtures thereof.

A lithium secondary battery according to one embodiment of the present invention comprises a jelly-roll type electrode assembly having a positive electrode plate, a negative electrode plate, and a separator positioned between the positive and negative electrode plates. The battery further comprises a deformation prevention core near the center of the electrode assembly, a battery case containing the electrode assembly; and a cap assembly coupled to the case to seal the case. The cap assembly comprises a terminal electrically connected to the electrode assembly. The battery case can comprise either a cylindrical metallic case having an open end, a metallic can having an open end, or a pouch.

A method for manufacturing a lithium secondary battery according to one embodiment of the present invention comprises first attaching a positive electrode tab to the positive electrode plate and attaching a negative electrode tab to the negative electrode plate. A separator is then positioned between the positive and negative electrode plates, and the positive and negative electrode plates and the separator are wound around a deformation prevention core to form an electrode assembly. The electrode assembly is then contained in the battery case.

The method can further comprise fixing the separator to the deformation prevention core with a tape.

When the battery case comprises a cylindrical metallic case, the method can further comprise using the deformation prevention core to press and weld either the positive or negative electrode tab of the electrode assembly to the surface of the battery case.

BRIEF DESCRIPTION OF THE DRAWINGS

The above and other features and advantages of the present invention will become more apparent with reference to the following detailed description when considered in conjunction with the accompanying drawings in which.

DETAILED DESCRIPTION

Figure 1:
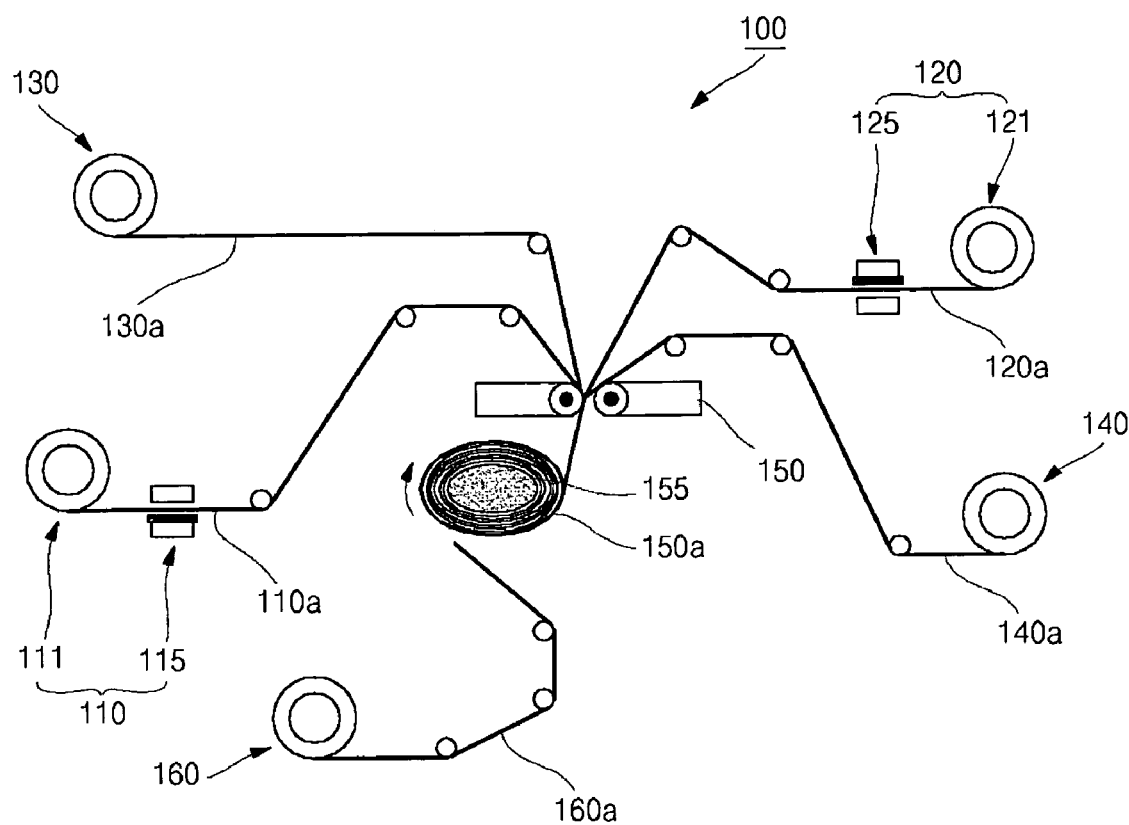
FIG. 1 is a schematic view of a method of manufacturing a lithium secondary battery according to one embodiment of the present invention.

FIG. 1 is a schematic view of a manufacturing method of a lithium secondary battery according to one embodiment of the present invention. As shown in FIG. 1, the method comprises first forming an electrode assembly 150a by winding a positive electrode plate 110a, a negative electrode plate 110b, a first separator 130a and a second separator 140a. A positive electrode source 110 supplies the positive electrode plate 110a, a negative electrode source supplies the negative electrode plate 120a, a first separator source 130 supplies the first separator 130a and a second separator source 140 supplies the second separator 140a. An electrode assembly winding device 150 winds the electrode assembly 150a.

The positive electrode source 110 includes a positive electrode reel 111 for supplying the positive electrode plate 110a, and a positive electrode tab attachment device 115 for attaching a positive electrode tab to the positive electrode plate 110a.

The negative electrode source 120 includes a negative electrode reel 121 for supplying the negative electrode plate, and a negative electrode tab attachment device 125 for attaching a negative electrode tab to the negative electrode plate 120a.

The first separator 130a and the second separator 140a prevent short circuits between the positive electrode plate 110a and the negative electrode plate 120a. In addition, the separators allow only lithium ions to pass. The first separator source 130 and the second separator source 140 position the separators 130a and 140a between the positive electrode plate 110a and the negative electrode plate 120a during winding of the electrode assembly 150a. The first separator source 130 and the second separator source 140 each comprise a reel on which the respective separators are wound.

The electrode assembly winding device 150 forms a jelly-roll type electrode assembly 150a by winding the positive electrode plate 110a, the negative electrode plate 120a and the separators 130a and 140a around a deformation prevention core 155, such as a mandrel, which can take various shapes. The deformation prevention core 155 is not removed after winding the electrode assembly 150a.

In cylindrical lithium secondary batteries, the deformation prevention core comprises a rod having a substantially circular cross-section and functions as a center pin. In square type or pouch type lithium secondary batteries, the deformation prevention core 155 comprises a plate. The deformation prevention core 155 prevents deformation of the electrode assembly 150a.

The manufacturing device 100 can further include a sealing tape source 160. The sealing tape source 160 supplies a sealing tape 160a which is attached to the outer surface of the electrode assembly after winding and prevents the electrode assembly 150a from unwinding.

According to this method for manufacturing the electrode assembly of the lithium secondary battery, the positive electrode plate 110a, the negative electrode plate 120a, and the separators 130a and 140a are wound around the deformation prevention core 155 by the electrode assembly winding device 150. Before being wound, however, the positive electrode tab is attached to the positive electrode plate 110a by the positive electrode tab attachment device 115 and the negative electrode tab is attached to the negative electrode plate 120a by the negative electrode tab attachment device 125.

After attaching the positive and negative electrode tabs, the electrode assembly 150a is formed by winding the positive and negative electrode plates 110a and 120a, respectively, and the separators 130a and 140a around the deformation prevention core 155 several times.

The separators 130a and 140a can be fixed at their ends to the deformation prevention core 155 by tape. Nonlimiting examples of suitable tapes include polypropylene, polyethylene, polyester, and nylon resins.

Alternatively, the separators 130a and 140a can be fixed at their ends to the deformation prevention core 155 by an adhesive. Nonlimiting examples of suitable adhesives include polyvinylidenefluoride (PVDF), co-polymers of poly-hexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon and mixtures thereof.

After forming the jelly-roll type electrode assembly 150a, a sealing tape 160a for preventing the jelly-roll type electrode assembly from unwinding can be attached to the outer surface of the electrode assembly. Nonlimiting examples of suitable sealing tapes 160a include polypropylene, polyethylene, polyester, and nylon resins.

The lithium secondary battery is completed by attaching the sealing tape 160a to the jelly-roll type electrode assembly 150a, containing the electrode assembly 150a including the deformation prevention core in the battery case, injecting an electrolyte into the battery case, and sealing the battery case.

In cylindrical lithium secondary batteries, the deformation prevention core 155 functions as a center pin. By applying pressure to the electrode tab with the deformation prevention core, the electrode tab contacts the battery case, thereby attaching it to the battery case.

In square type or pouch type lithium secondary batteries, the core 155 prevents the jelly-roll type electrode assembly from deforming due to pressure or heat.

Figure 2A:
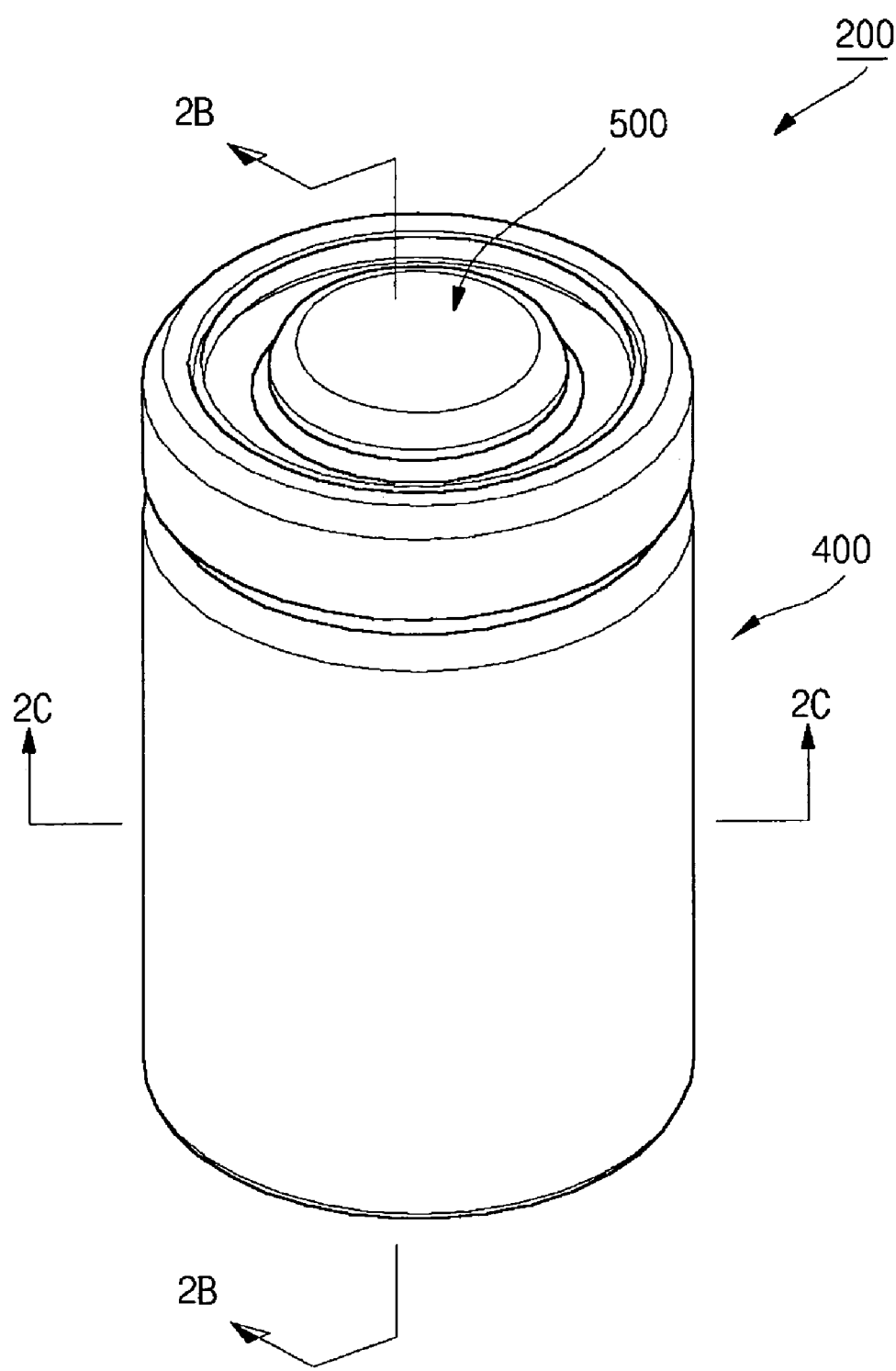
FIG. 2A is a perspective view of a lithium secondary battery according to one embodiment of the present invention.
Figure 2B:
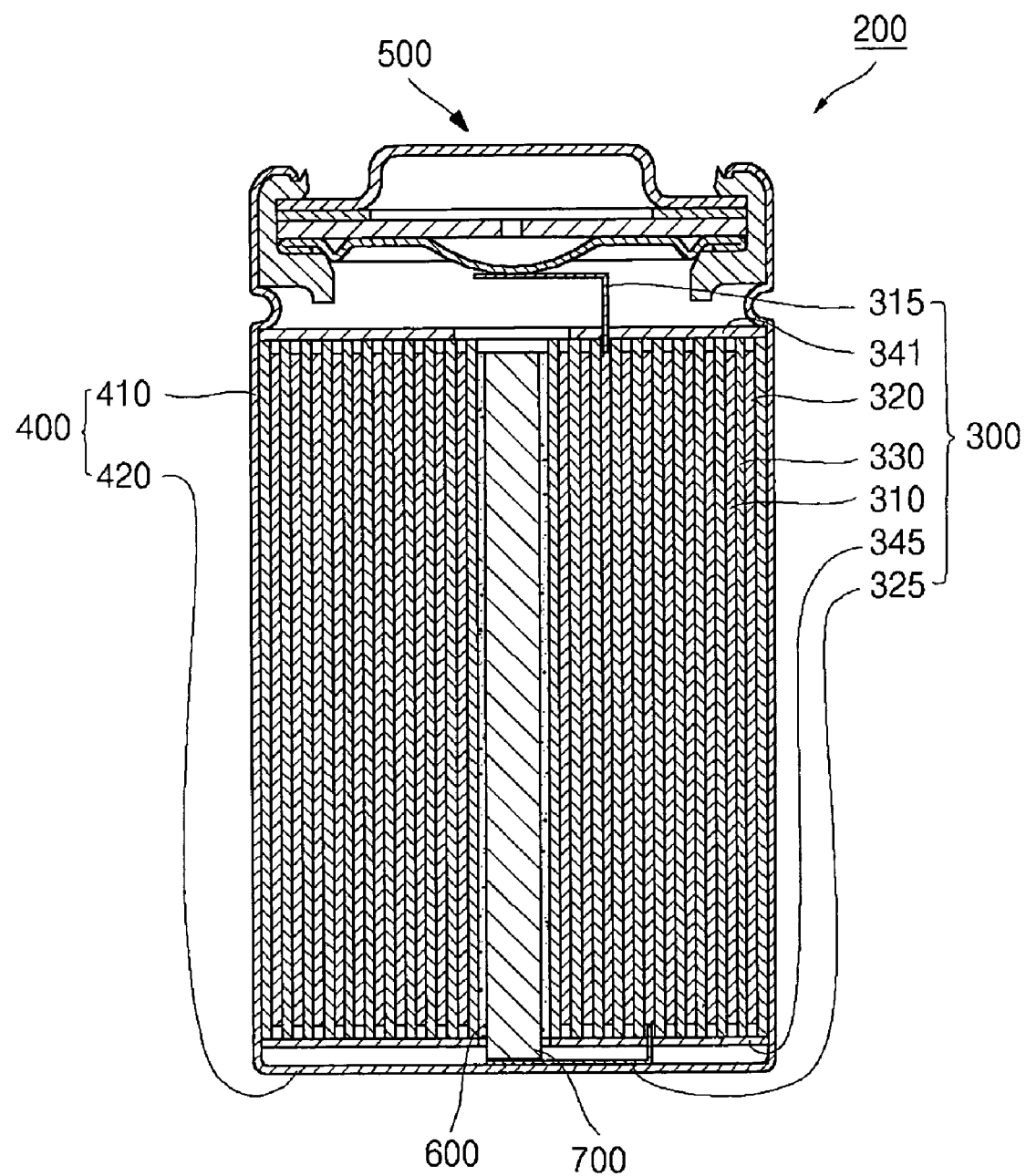
FIG. 2B is a cross-sectional view of the battery of FIG. 2A, taken along line 2B-2B.
Figure 2C:
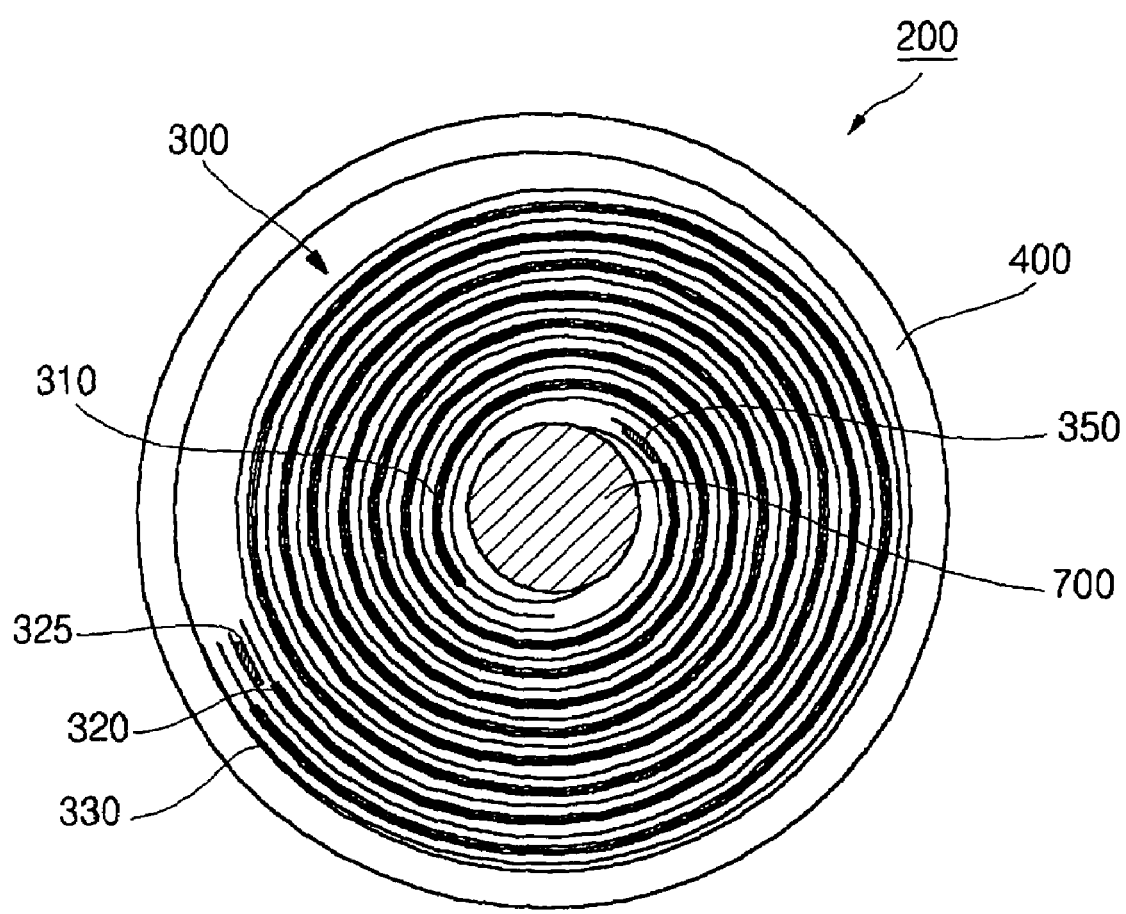
FIG. 2C is a cross-sectional view of the battery of FIG. 2A, taken along line 2C-2C.

FIG. 2A is a perspective view of a lithium secondary battery according to one embodiment of the present invention, and depicts a cylindrical lithium secondary battery. FIG. 2B is a cross-sectional view of the battery of FIG. 2A, taken along line 2B-2B. FIG. 2C is a cross-sectional view of the battery of FIG. 2A, taken along line 2C-2C. As shown in FIGS. 2A to 2C, a cylindrical lithium secondary battery 200 includes an electrode assembly 300 for generating a voltage difference during charging or discharging, a battery case 400 for containing the electrode assembly 300, and a cap assembly 500 for sealing the battery case 400. An electrolyte is injected into the battery case 400, and enables movement of lithium ions. A deformation prevention core 700 is provided near the center of the electrode assembly 300.

The electrode assembly 300 includes a positive electrode plate 310 on which a positive electrode active material is coated, a negative electrode plate 320 on which a negative electrode active material is coated, and a separator 330 positioned between the positive and negative electrode plates 310 and 320, respectively. The separator 330 prevents short circuits between the positive and negative electrode plates 310 and 320, respectively, and allows only lithium ions to pass. The positive and negative electrode plates 310 and 320, respectively, and the separator 330 are wound to a substantially circular shape to form the electrode assembly 300. The wound electrode assembly 300 is contained in the battery case 400. A positive electrode tab 315, generally comprising aluminum and protruding from the electrode assembly 300, is bonded to the positive electrode plate 310. A negative electrode tab 325, generally comprising nickel and protruding from the electrode assembly 300, is bonded to the negative electrode plate 310. It is understood that the positive and negative electrode tabs 315 and 325, respectively, are not limited to aluminum and nickel, respectively, but can comprise any suitable material.

A first insulation layer 341 is positioned between the electrode assembly 300 and the cap assembly 500, and a second insulation layer 345 is positioned between the electrode assembly 300 and the battery case 400. The insulation layers 341 and 345 prevent direct contact of the electrode assembly 300 with the cap assembly 500 and battery case 400.

The battery case 400 can be a cylindrical metal case having an opening for receiving the electrode assembly 300. The cylindrical battery case 400 comprises a side surface 410 and a bottom surface 420 for closing the bottom of the case 400. The top surface of the case 400 is open for receiving the electrode assembly 400.

In one embodiment, the battery case 400 is electrically connected to one of the positive electrode tab 315 and the negative electrode tab 325 of the electrode assembly 300, and the battery case 400 itself functions as the positive or negative electrode. The cap assembly 500 is electrically connected to the electrode tab that is not electrically connected to the battery case 400, and can comprise various elements, such as a safety belt, a printed circuit board, a positive thermal device, an electrode cap, a gasket, etc.

The electrolyte 600 functions as a medium for movement of lithium ions generated by electrical and chemical reactions in the positive and negative electrodes during charging or discharging. The electrolyte can be a nonaqueous organic electrolyte comprising a mixture of a lithium salt and a very pure organic solvent. Alternatively, the electrolyte 600 can be a high molecular weight material, such as a polymer. It is understood that any suitable electrolyte may be used, and that the invention is not limited to nonaqueous organic electrolytes and polymers.

The deformation prevention core 700 of the electrode assembly can comprise a mandrel around which the positive and negative electrode plates 310 and 320, respectively, and the separator 330 are wound. In one embodiment, the deformation prevention core 700 comprises a rod. The deformation prevention core 700 functions as a center pin in a cylindrical lithium secondary battery 200 and prevents deformation of the electrode assembly 300.

Specifically, the deformation prevention core 700 prevents the jelly-roll type electrode assembly from unwinding, and presses the negative electrode tab 325 against the bottom surface 420 of the battery case 400. In addition, the deformation prevention core 700 prevents deformation of the electrode assembly 300 which may normally result from volume expansion of the electrode assembly 300 during charging or discharging.

The deformation prevention core 700 is mechanically strong enough to resist force applied to the electrode assembly, thereby preventing deformation of the electrode assembly 300.

The deformation prevention core 700 can comprise a metallic material or an insulative material, for example, polyethylene, polypropylene, polyethyleneterephthalate, and polyimide.

In one embodiment, the separator 330 is fixed at one end to the deformation prevention core 700 by a tape or adhesive.

The electrode assembly 300 may further comprise a sealing tape attached to the outer surface of the electrode assembly 300 for preventing the electrode assembly 300 from unwinding.

Figure 3A:
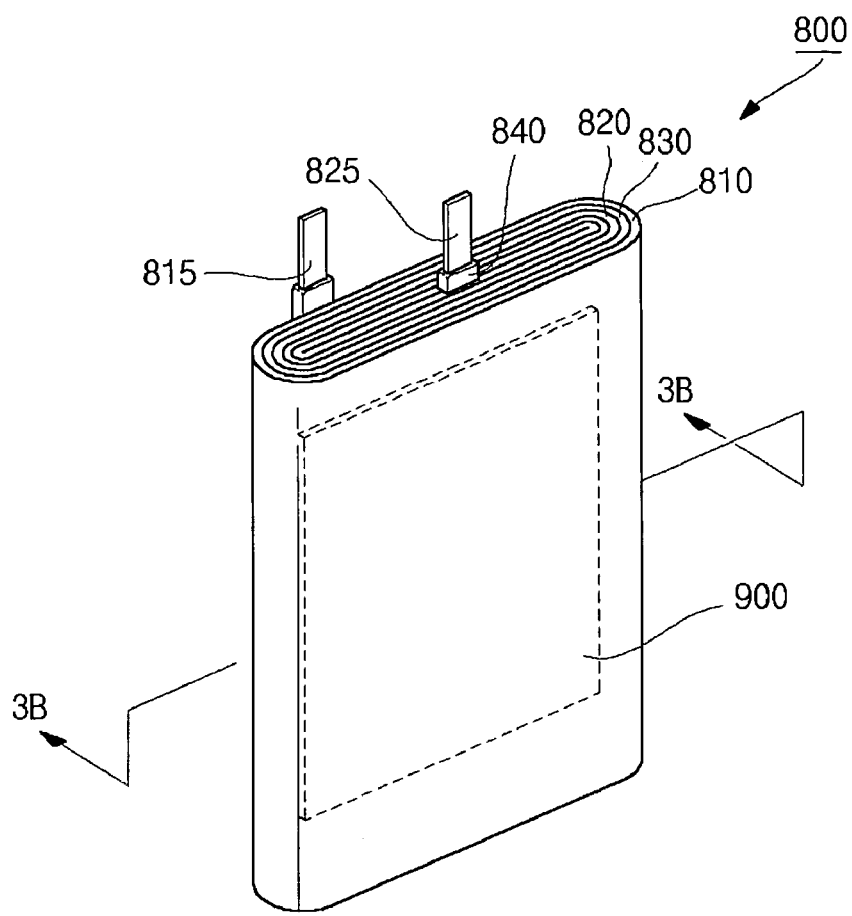
FIG. 3A is a perspective view of a lithium secondary battery according to an alternative embodiment of the present invention.
Figure 3B:
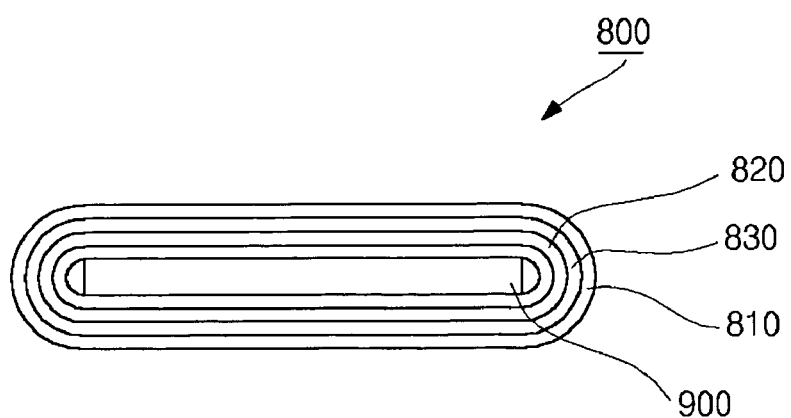
FIG. 3B is a cross-sectional view of the battery of FIG. 3A, taken along line 3B-3B.

FIG. 3A is a perspective view of an electrode assembly of a lithium secondary battery according to another embodiment of the present invention, and depicts an electrode assembly for use in a square type or pouch type lithium secondary battery. FIG. 3B is a cross-sectional view of the battery of FIG. 3A, taken along line 3B-3B. As shown in FIGS. 3A and 3B, a lithium secondary battery includes an electrode assembly 800. The electrode assembly is contained within a battery case (not shown). The battery case can be a metallic can having an open end, or a pouch. In a lithium secondary battery comprising a metallic can battery case, the open end of the metallic can is sealed by a separate cap assembly.

The electrode assembly 800 comprises a positive electrode plate 810, a negative electrode plate 820, and a separator 830 positioned between the positive and negative electrode plates 810 and 820, respectively. A positive electrode active material is coated on the positive electrode plate 810, and a positive electrode tab 815 is attached to the positive electrode plate 810. A negative electrode active material is coated on the negative electrode plate 820, and a negative electrode tab 815 is attached to the negative electrode plate. The electrode assembly is formed by winding the positive and negative electrode plates 810 and 820, respectively, and the separator around a deformation prevention core 900.

The deformation prevention core 900 is not removed after winding the electrode assembly 800, and prevents the electrode assembly 800 from unwinding and deforming.

The deformation prevention core 900 can have any thickness such that the it resists the force applied to the electrode assembly and prevents deformation of the electrode assembly 800.

The deformation prevention core 900 can comprise a variety of plate-shaped structures, such as a rectangular plate-shaped structure, as shown in FIG. 3A. The deformation prevention core 900 can generally comprise a metallic or insulative material. Nonlimiting examples of suitable materials for the core include polyethylene, polypropylene, polyethyleneterephthalate, and polyimide.

In one embodiment, as shown in FIG. 3B, the deformation prevention core 900 is sized to contact the inner periphery of the electrode assembly 800. The deformation prevention core 900 mechanically supports the entire area of the electrode assembly 800. As used, the "inner periphery" of the electrode assembly 800 is the inner surface of the electrode assembly 800 located near the center of the electrode assembly 800.

The separator 830 may be fixed to the deformation prevention core 900 by a tape or adhesive.

The electrode assembly 800 may further comprise a sealing tape attached around the outer surface of the electrode assembly 800 for preventing the electrode assembly 800 from unwinding.

As noted above, the lithium secondary batteries according to the present invention include a deformation prevention core 155, 700 or 900 near the center of the electrode assembly 150a, 300, or 800. The deformation prevention core 155, 700 or 900 prevents deformation of the electrode assembly 150a, 300 or 800 during charging or discharging.

In cylindrical lithium secondary batteries, the deformation prevention core 155, 700 or 900 also functions as a center pin, omitting the need to separately insert such a center pin. Also, winding the electrode assembly around a mandrel omits the need to separately insert a core. The deformation prevention cores according to the present invention enable simplification of the manufacture of lithium secondary batteries.

Exemplary embodiments of the present invention have been described for illustrative purposes only. Those skilled in the art will appreciate that various modifications, additions and substitutions can be made without departing from the spirit and scope of the invention as disclosed in the accompanying claims.

What is claimed is:

1. A wound electrode assembly comprising:
    a positive electrode plate on which a positive electrode active material is coated;
    a negative electrode plate on which a negative electrode active material is coated;
    a separator positioned between the positive and negative electrode plates, wherein the separator insulates the positive electrode plate from the negative electrode plate; and
    a solid deformation prevention core located at or near a center of the wound electrode assembly, wherein the positive and negative electrode plates and the separator are wound around the deformation prevention core, and wherein the separator is fixed at one end to the deformation prevention core.

2. A wound electrode assembly according to claim 1, wherein the deformation prevention core comprises an insulative material selected from the group consisting of polyethylene, polypropylene, polyethyleneterephthalate, and polyimide.

3. A wound electrode assembly according to claim 1, wherein the separator is fixed to the deformation prevention core by a tape comprising a material selected from the group consisting of polypropylene, polyethylene, polyester, and nylon resins.

4. A wound electrode assembly according to claim 1, wherein the separator is fixed to the deformation prevention core by an adhesive selected from the group consisting of polyvinylidenefluoride (PVDF), co-polymers of poly-hexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon and mixtures thereof.

5. A lithium secondary battery comprising:
    a wound electrode assembly having a positive electrode plate, a negative electrode plate, a separator positioned between the positive and negative electrode plates, and a solid deformation prevention core located at or near the center of the wound electrode assembly, wherein the separator is fixed at one end to the deformation prevention core;
    a battery case adapted to contain the electrode assembly; and
    a cap assembly for sealing the battery case, wherein the cap assembly comprises a terminal electrically connected to the wound electrode assembly.

6. A lithium secondary battery according to claim 5, wherein the deformation prevention core comprises a rod.

7. A lithium secondary battery according to claim 5, wherein the deformation prevention core comprises a plate.

8. A lithium secondary battery according to claim 5, wherein the deformation prevention core comprises a metallic material.

9. A lithium secondary battery according to claim 5, wherein the deformation prevention core comprises an insulative material.

10. A lithium secondary battery according to claim 5, wherein the separator is fixed at one end to the deformation prevention core by a tape.

11. A lithium secondary battery according to claim 5, wherein the separator is fixed at one end to the deformation prevention core by an adhesive.

12. A lithium secondary battery according to claim 5, wherein the battery case comprises a cylindrical metallic case having an open end.

13. A lithium secondary battery according to claim 5, wherein the battery case comprises a generally rectangular metallic can having an open end.

14. A lithium secondary battery according to claim 5, wherein the battery case comprises a pouch.

15. A method for manufacturing a lithium secondary battery comprising:
    attaching a positive electrode tab to a positive electrode plate;
    attaching a negative electrode tab to a negative electrode plate;
    positioning a separator between the positive and negative electrode plates;
    winding the positive and negative electrode plates and the separator around a solid deformation prevention core to form an electrode assembly, wherein the separator is fixed at one end to the deformation prevention core; and
    containing the electrode assembly in a battery case.

16. A method for manufacturing a lithium secondary battery according to claim 15, wherein the separator is attached to the deformation prevention core with a tape.

17. A method for manufacturing a lithium secondary battery according to claim 15, wherein the separator is attached to the deformation prevention core with an adhesive.

18. A method for manufacturing a lithium secondary battery according to claim 15, further comprising pressing one of the positive electrode tab and the negative electrode tab to a lower surface of the battery case with the deformation prevention core.

* * * * *